J. NEWMANN.
PULLEY COUPLING.
APPLICATION FILED MAY 16, 1910. RENEWED JULY 29, 1911.
1,003,493.
Patented Sept. 19, 1911.
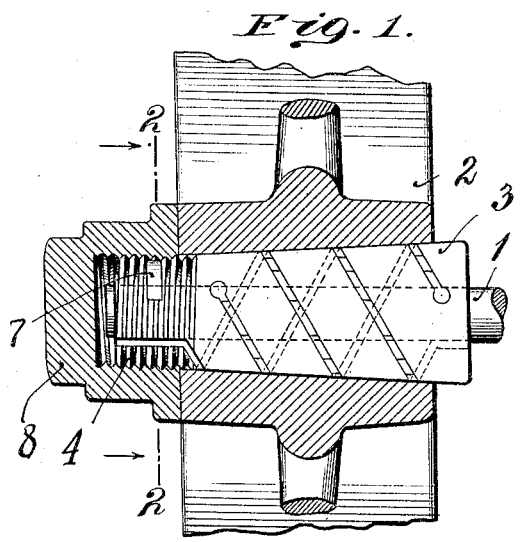
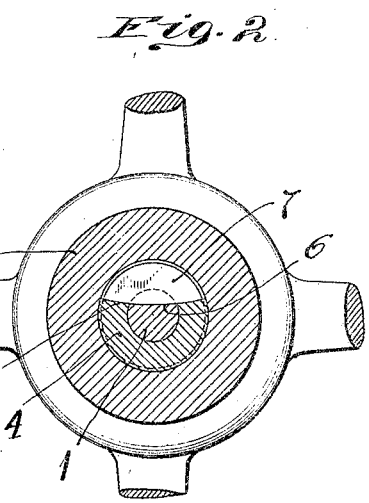
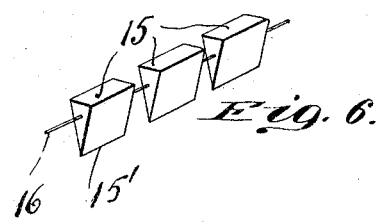
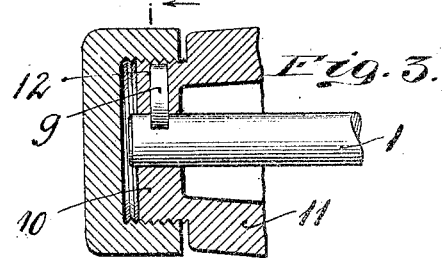
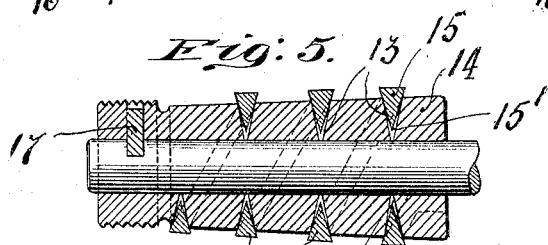
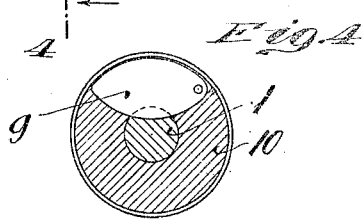
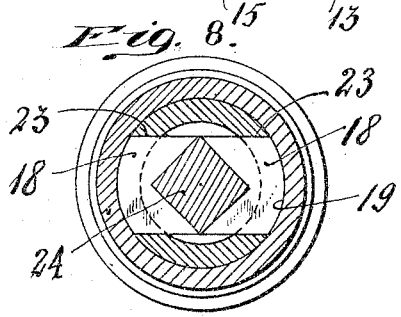
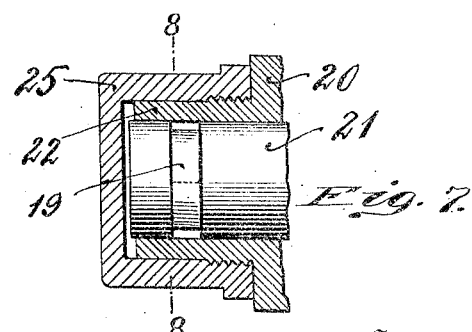
Witnesses:
Harry C. Hebig
R. Brockman
Inventor
John Newmann
By his Attorney
Max V. Ordmann

UNITED STATES PATENT OFFICE.

JOHN NEWMANN, OF BROOKLYN, NEW YORK.

PULLEY-COUPLING.

1,003,493.　　　Specification of Letters Patent.　　Patented Sept. 19, 1911.

Application filed May 16, 1910, Serial No. 561,513.　Renewed July 29, 1911.　Serial No. 641,382.

*To all whom it may concern:*

Be it known that I, JOHN NEWMANN, a citizen of the United States of America, residing at Brooklyn, in the county of Kings and State of New York, have invented certain new and useful Improvements in Pulley-Couplings, of which the following is a specification.

The present invention relates to means for coupling pulleys and shafts or any other rotary members and has for its object to provide a construction whereby the coupling and uncoupling can be easily and rapidly effected.

With this object in view, my invention consists in the construction, arrangement and combination of parts that will be hereinafter more fully specified.

Reference is had to the accompanying drawing, in which similar reference numerals denote corresponding parts and in which—

Figure 1 is a vertical section of my improved coupling; Fig. 2 a cross section on line 2—2 of Fig. 1; Fig. 3 a similar section as Fig. 1 of a modified construction; Fig. 4 a cross section on line 4—4 of Fig. 3; Fig. 5 a longitudinal section of a second modification; Fig. 6 a perspective view of a detail thereof; Fig. 7 a longitudinal section of a third modification and Fig. 8 a cross section on line 8—8 of Fig. 7.

With reference to Figs. 1 and 2, 1 denotes the shaft and 2 the pulley to be coupled to it. 3 denotes a spirally slotted sleeve of the kind described and shown in my former Patent, No. 934,622 of September 21, 1909. This elastic sleeve is conical and adapted before coupling to loosely fit on the shaft and to receive and carry the pulley. The end of this sleeve, toward which the same is tapered, is extended and threaded as at 4 and provided with a transversely extending slot or recess preferably of elliptical shape, as at 5. In the shaft 1 a groove 6 is made which is of similar shape as and adapted to register with the recess 5, to engage a tongue or locking bar 7, which after the proper adjustment of the sleeve on the shaft is dropped into the groove 6 through the recess 5 whereby the sleeve and shaft are locked or coupled together. The bore of the hub of the pulley is of such dimension that when forced completely onto the elastic sleeve, it will compress the latter and cause it to clamp the shaft in the manner described in my above named prior patent. The pulley can be forced onto the sleeve by means of a nut or threaded cap 8 which at the same time will cover the tongue and prevent it from jumping out of its locking position.

In the modification shown in Figs. 3 and 4, the tongue or locking bar 9 is pivoted or hinged in the lateral extension 10 of the part 11 to be coupled to the shaft and adapted to engage the groove in the shaft through the slot or recess 12 in the extension. In this case the tongue after adjustment of the part 11 on the shaft is swung down as a lid to engage the shaft.

In the modification shown in Figs. 5 and 6, in which the pulley is not shown, the spiral slots 13 of the sleeve 14 are tapered inward toward the longitudinal axis thereof and one or a number of wedge-shaped tongues 15 of hardened steel having sharp edges 15' are adapted to fit in the slots. These wedges are somewhat longer than the depth of the spiral slots or the thickness of the sleeve so that before the coupling of the parts they will slightly project outward. When the pulley is forced onto the conical sleeve, the wedges will be driven inward to their full extent and with their sharp edges bite the shaft which is not hardened, whereby an effective coupling is obtained. When using more than one wedge, the same may be connected together by a flexible wire 16 (Fig. 6). In addition to these wedge-shaped tongues, a lateral tongue 17 may be provided in the threaded extension of the sleeve 14, as in the aforedescribed modifications.

In Figs. 7 and 8 a third modification is shown. Here instead of elliptical tongues, two rectangular tongues 18 may be provided which have circularly shaped outer surfaces 19. The part 20 to be coupled to the shaft 21 is formed with a sleeve 22 which is provided with diametrically arranged circumferential slots 23, in which the circularly curved surfaces 19 of the tongues 18 are adapted to fit. The tongues with their inner rectangular faces are adapted to engage around a square 24 made at one end of the shaft 21, whereby the latter and part 20 become effectively coupled. To hold the tongues in position, a cap 25 may be screwed over the lateral sleeve 23. It is understood that these tongues, as the elliptical tongues shown in Figs. 1–4, may be used either as an auxiliary safety device for coupling the aforedescribed elastic sleeve to the shaft, in addition to the wedges 15 or as the sole coupling means.

What I claim and desire to secure by Letters Patent is:

1. A coupling for pulley and shaft, comprising a conical, spirally-slotted sleeve mounted on the shaft and adapted to carry and be compressed by the pulley, and gripping members in said spiral slots adapted when pressed inward to grip the shaft.

2. A coupling for pulley and shaft, comprising a conical sleeve mounted on the shaft and adapted to carry and be compressed by the pulley, said sleeve having spiral, inwardly tapered slots and wedges in said slots and adapted to grip the shaft locking the sleeve to the latter.

3. A coupling for pulley and shaft, comprising a conical sleeve mounted on the shaft and adapted to carry and be compressed by the pulley, said sleeve having spiral, inwardly-tapered slots, wedges fitting in said slots and adapted to grip the shaft locking the sleeve to the latter and safety tongues at one end of said sleeve.

In testimony whereof I affix my signature in presence of two witnesses.

JOHN NEWMANN.

Witnesses:
  Max D. Ordmann,
  Ellis V. Levy.